Sept. 29, 1925.  
A. S. THOMPSON  
CHUCK ENGRAVING BLOCK  
Filed Dec. 4, 1924   2 Sheets-Sheet 1

1,555,774

Inventor  
Arthur S. Thompson,  
By  
Attorney

Sept. 29, 1925.　　　　　　　　　　　　　　　　1,555,774
A. S. THOMPSON
CHUCK ENGRAVING BLOCK
Filed Dec. 4, 1924　　　　2 Sheets-Sheet 2

Inventor
Arthur S. Thompson,
By
Attorney

Patented Sept. 29, 1925.

1,555,774

UNITED STATES PATENT OFFICE.

ARTHUR S. THOMPSON, OF ONTARIO, CALIFORNIA.

CHUCK ENGRAVING BLOCK.

Application filed December 4, 1924. Serial No. 753,878.

*To all whom it may concern:*

Be it known that I, ARTHUR S. THOMPSON, a resident of Ontario, in the county of San Bernardino and State of California, a citizen of the United States, have invented certain new and useful Improvements in Chuck Engraving Blocks, of which the following is a specification.

This invention relates to chucks and more especially to chucks for holding articles of jewelry or silverware that are being beaded, chased or having precious stones inserted therein and the object of the invention is to provide means for holding articles having tapering or non-parallel sides such as spoon and fork handles or rings and where is a divided base are the two parts that are made movable with relation to each other and on a platform and each part has pivoted on its upper face a jaw to be adjusted towards or from each other to clamp the article to be worked upon.

Another object is to provide filling pieces for the faces of the jaws to afford different angles for the jaws.

These and other objects and details of the invention are more fully described in the following specification, set forth in the appended claims and illustrated in the accompanying drawings, wherein:

Figure 1:
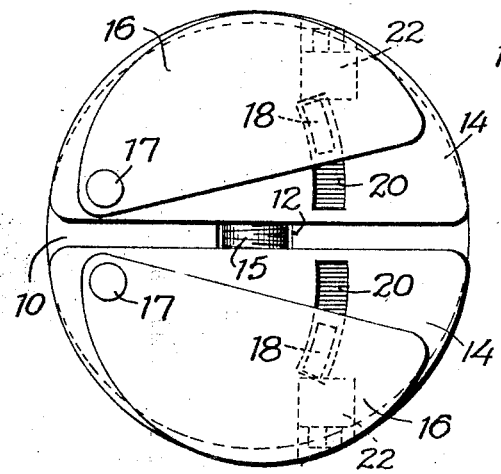
Figure 1 is a plan view of the improved chuck engraving block.
Figure 2:
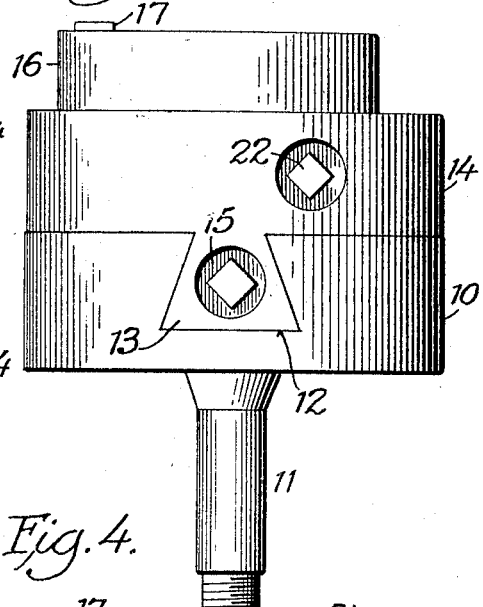
Fig. 2 is a side elevation of the same.
Figure 3:
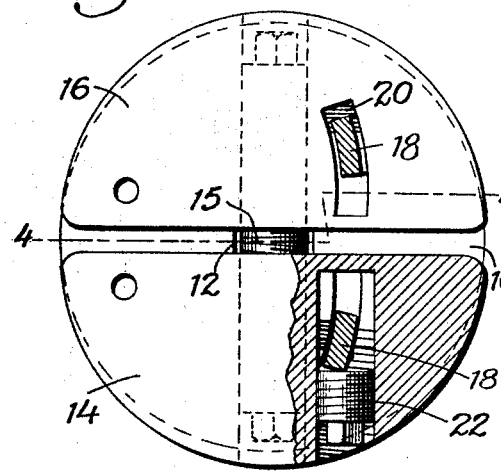
Fig. 3 is a plan view of the chuck with the jaws removed and partly in section.
Figure 4:
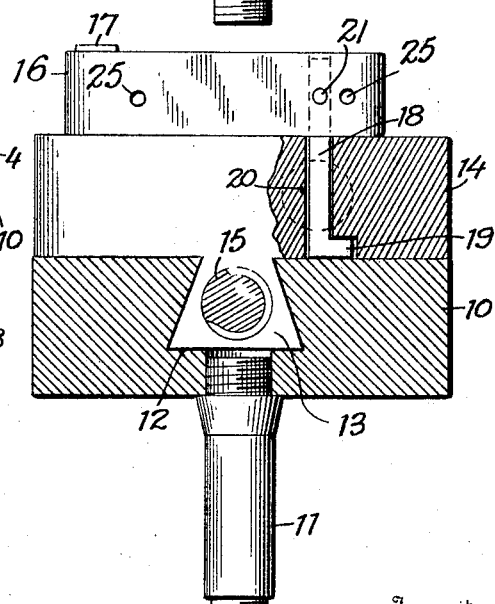
Fig. 4 is a vertical sectional view through the platform and one of the divisions of the base on the line 4—4 of Fig. 3.
Figure 5:
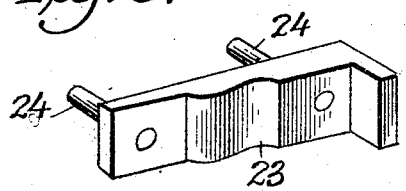
Fig. 5 is a perspective view of one of the filling pieces.

The chuck is substantially a work holder for jewelry and fine metal work and is used in connection with a container in which it is held and both are adapted to rotate in a base in order to allow the work to be operated on from all quarters.

The chuck is especially shown in Figs. 1 to 4 and consists of the block or platform 10 from which depends a stem 11 threaded at its lower end and having a transverse dovetail channel 12 in which play the dovetail tongues 13 of the identical base pieces 14 and the two dovetails are bored and tapped for the two way screw 15 that may be rotated to cause the pieces to approach each other or to separate, and to carry with them the jaws 16 that are pivoted by means of studs 17 at one end to the divided base pieces 14 and are adapted to swing thereon.

From the lower side of the jaws 16 depend the right angled shaped bars 18 having angular extensions 19 and playing in similarly shaped slot 20 in the base pieces 14 that are also arcs of the pivotal studs 17. The extension 19, holds the outer ends of the jaws in place and prevent their riding off the bases and they are secured at their upper ends in sockets in the jaws by pins 21.

The principal function of the bars 18 is to provide a means for adjustment of the jaws and clamping the object to be treated and this is done by the screws 22 that are adjustable in the base pieces and bear upon the bars when screwed inward.

By means of the screw 15 the base pieces may be advanced or retracted and the angle of the adjacent fans of the jaws may be varied in conjunction with the screws 22 but in order to provide other angles or variations filling pieces 23 are used and have pins 24 that fit into perforations 25 in the faces of the jaws. These filling pieces 23 may be provided with appropriate contour for specially shaped articles in addition to angular variations.

Figure 6:
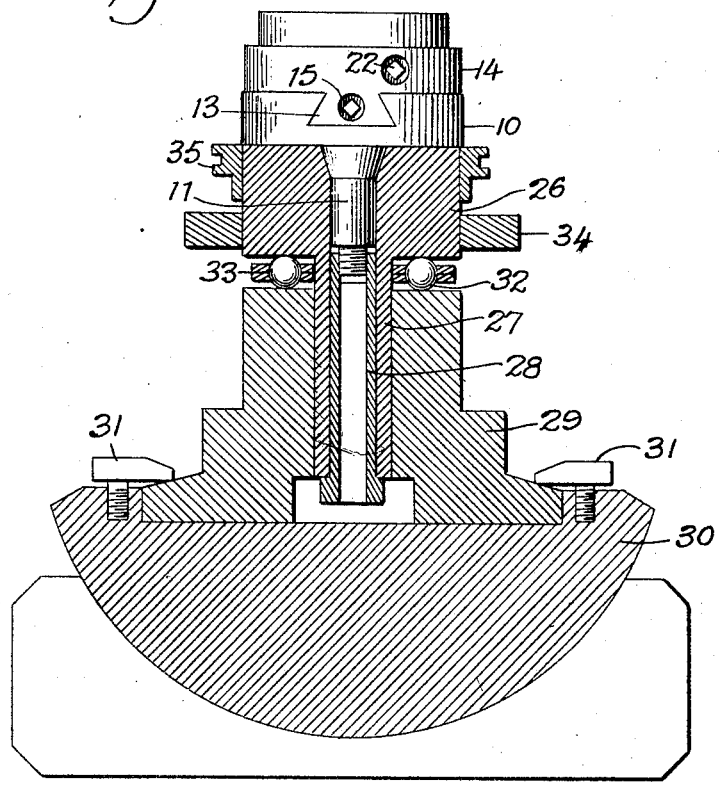
Fig. 6 is a sectional view of the container for the chuck and the latter secured therein and located in the block base.

The operation of the chuck is more clearly shown in Fig. 6 where the stem 11 will be seen fitting into a similar shaped passage at the center of the container 26 and which continues down and through the sleeve 27 which is adapted to receive a core 28 hollow through its length and interiorly threaded at the top to engage the threads at the end of the stem 11 and having a square lower end 29 so that it may be rotated by a key in order to connect it with the stem.

The sleeve 27 is adapted to fit the bore of the base 29 that is held in the semi-spherical block 30 by means of the jaws 31 to permit of the tilting or moving of the whole structure from the vertical.

While the core 28 is adapted to hold the chuck and the container together it does not prevent the rotation of the two in the base and ease of rotation is further provided for by the ball bearings 32 held in the frame 33 between the container and the base, and in order to facilitate this rotation a milled ring 34 is provided to rotate the container manually.

The container also carries a ring 35 with the desirable number of indents or teeth to receive a stationary index to provide for a step by step rotation of the chuck and container.

Figure 7:
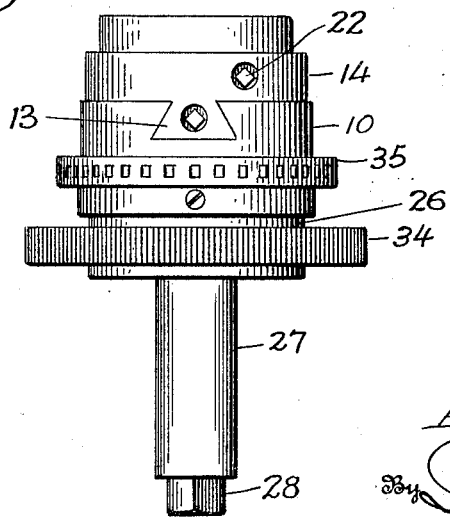
Fig. 7 is an elevation of the chuck and the container.

The index ring and the milled ring are more clearly seen in Fig. 7 and in connection with the clutch.

It is obvious that other arrangements and modifications of the chuck may be resorted to without departing from the essential features above described or from the scope of the appended claims.

What I claim is:

1. In a chuck, the combination of a platform, a divided base, means for adjusting the two parallel arranged parts of the divided base with relation to each other, jaws pivoted on the divided base to swing in the arc of a circle, retaining and guiding means for the jaws arranged in the base and the forward portion of said jaws and consisting of a right angled shaped bar, and means for opening and closing the jaws.

2. In a chuck the combination of a platform, a base comprising two parts having their inner faces parallel and adapted to be adjusted to or from each other, a jaw pivoted on each of the two parts to move in the arc of a circle, guiding means for the jaws arranged in the base and the forward portion of said jaws and consisting of a right angled shaped bar, and an adjusting screw for each jaw.

3. In a chuck, the combination of a platform having a dovetail channel on its face, a divided base with tongues secured in the channel, a two-way adjusting screw working in the tongues, a jaw pivoted on each section of the divided base to move in the arc of a circle, a depending bar from each jaw having a substantially right-angled retaining extension at its lower end, and an adjusting screw in each base section and adapted to impinge the depending bars.

4. In a chuck, the combination of a platform having a stud in its lower side and a dovetail channel in its upper side, a base comprising identical parts having their inner faces parallel and having tongues adapted to play in the channels, a two-way screw playing in the tongues and adapted to adjust the parts of the base with relation to each other, a jaw pivoted at one end to each part of the base to move in the arc of a circle, a bar depending from each jaw and having an extension at their lower ends playing in a slot in a base part, a screw playing in each part of the base and adapted to impinge on a jaw face, and a removable filling piece for the jaw face.

5. In a chuck engraving block, the combination of a block having a dovetail channel, a two-part base with tongues to play in the channel, jaws pivoted near one end to and carried by the two-part base, adjusting screws for the two-part base and the jaws, bars connecting the jaws and base, a container with a bore having a depending sleeve, a stem fitting in said sleeve a base having an opening to receive the sleeve, a core adapted to pass through the opening and sleeve to engage the end of the stem, ball bearings between the container and the base, and a milled ring to rotate the container.

6. In a chuck of the character described, the combination of a support, a two-part parallel adjustable base, a pair of jaws movable in the arc of a circle on said base, guiding means for the jaws arranged in the base and the forward portion of said jaws and consisting of a right angled shaped bar, and a filling piece adapted to engage and be fitted between said jaws.

In testimony whereof I hereunto affix my signature.

ARTHUR S. THOMPSON.